(12) United States Patent
Phillips

(10) Patent No.: US 6,801,017 B2
(45) Date of Patent: Oct. 5, 2004

(54) CHARGER FOR RECHARGEABLE NICKEL-ZINC BATTERY

(75) Inventor: Jeffrey Phillips, Santa Clara, CA (US)

(73) Assignee: PowerGenix Systems, Inc., Yukon (CA)

(*) Notice: Subject to any disclaimer, the term of this patent is extended or adjusted under 35 U.S.C. 154(b) by 0 days.

(21) Appl. No.: 10/429,692

(22) Filed: May 6, 2003

(65) Prior Publication Data

US 2004/0041542 A1 Mar. 4, 2004

Related U.S. Application Data

(63) Continuation of application No. PCT/CA01/01718, filed on Nov. 7, 2001.

(30) Foreign Application Priority Data

Nov. 10, 2000 (CA) ............................................. 2325595

(51) Int. Cl.[7] .................................................. H02J 7/00
(52) U.S. Cl. ...................................................... 320/148
(58) Field of Search ............................... 320/148, 124, 320/134

(56) References Cited

U.S. PATENT DOCUMENTS

| | | |
|---|---|---|
| 4,327,157 A | 4/1982 | Himy et al. |
| 4,503,378 A | 3/1985 | Jones et al. |
| 4,670,703 A | 6/1987 | William |
| 4,691,158 A * | 9/1987 | Hashimoto et al. .......... 320/131 |
| 5,523,668 A * | 6/1996 | Feldstein ..................... 320/118 |
| 5,619,118 A * | 4/1997 | Reipur et al. ................ 320/145 |

FOREIGN PATENT DOCUMENTS

EP          0493226 A1     7/1992

* cited by examiner

Primary Examiner—Gregory J. Toatley, Jr.
(74) Attorney, Agent, or Firm—Beyer Weaver & Thomas LLP

(57) ABSTRACT

A four-stage charging technique for nickel-zinc cells and batteries, is provided, whereby a high cycle life is assured, without dendrite formation or harmful overchange, with minimal shape change of the zinc electrode, and with minimal oxygen, recombination. In the first stage, the nickel-zinc cell or battery is charged with an average current less than C/5 for a period for less than five minutes, or until the terminal voltage of a cell reaches 1.75 volts to 1.79 volts. In the second stage, a fast charge is imposed, until the terminal voltage of a cells reaches between 1.88 volts and 1.92 volts. In the third stage, a moderate charge is imposed, until the terminal voltage of a cell reaches 1.90 volts to 1.94 volts. The forth stage gives a trickle charge when the terminal voltage is greater then 1.94 volts. Typically, each of the transitions between the Stages 1 and 2 and Stages 2 and 3 is determined by a temperature dependent voltage; the transition between Stages 3 and 4 is determined by a time dependent inflection point of the terminal voltage of the cell; and Stage 4 termination is determined when dV/dt=0.

11 Claims, 3 Drawing Sheets

CHARGER FOR RECHARGEABLE NICKEL-ZINC BATTERY

This is a continuation of PCT/CA01/01718, filed Nov. 7, 2001.

FIELD OF THE INVENTION

This invention relates to the multi-staged rapid charging of alkaline Nickel-Zinc cells and batteries.

BACKGROUND OF THE INVENTION

The performance of rechargeable zinc electrodes in alkaline electrolytes has been the subject of many studies that encompass the zinc electrode composition and the interaction with the electrolyte. A performance inhibiting disfigurement of the zinc electrode—shape change—occurs as cycling progresses. The most obvious effect is a lower than acceptable amp-hour capacity delivered at useable voltages. This tendency has been arrested by a number of approaches, particularly as they relate to the composition of the zinc electrode, or the consituency of a nickel-zinc cell.

The combination of more dilute potassium hydroxide electrolyte together with the addition of calcium hydroxide to the zinc electrode appears to be somewhat effective (U.S. Pat. No. 4,358,517). Alternative approaches that have used buffered electrolytes, with and without fluoride additions, have also resulted in increased zinc electrode life span. Noteworthy among these approaches is that described in U.S. Pat. No. 5,453,336 which teaches that a mixture of alkaline electrolyte (2–12M) combined with a carbonate of 0.5–4M and a fluoride of 0.5–4M is beneficial. In U.S. Pat. No. 4,273,841, Carlson describes another mixture that employs 5–10% hydroxide, 10–20% phosphate and 515% fluoride. Eisenberg describes two electrolyte formulations in U.S. Pat. Nos. 4,224,391 and 5,215,836. Both employ mixtures of potassium hydroxide and boric, phosphoric or arsenic acid. However, the latter patent describes advantages of alkali fluorides in the range of 0.01 to 1M. This allows the use of a more alkaline electrolyte—an electrolyte having greater alkalinity—with beneficial effects upon the utilization of the nickel electrode material.

Despite the plethora of literature claiming the merit of various configurations of the nickel-zinc system, there appears to be little commercial evidence of the success. As evidenced above, many formulations are credited with increasing the cycle life of the zinc electrode, but a number of problems clearly remain. Principal among these is the loss in capacity of both the zinc and nickel electrodes as cycling continues. A fundamental problem for a nickel-zinc system is the disparity in efficiencies of the zinc and nickel charging process. The need for significant (10% or more) nickel overcharging has frequently been quoted as a problem that results in the overcharge of the zinc electrode and the consequent evolution of hydrogen. A solution to this problem appears to be the optimization of sealed cells that rely on the oxygen recombination cycle. Theoretically, if the recombination is efficient, the charge efficiencies of the electrodes will equilibrate. Unfortunately the recombination efficiency of the zinc electrode is difficult to maintain, and does not approach the levels achieved by nickel cadmium cells. This eventually leads to gas expulsion, dry out of the cell, and cell degradation. Other problems of the zinc electrode are the degeneration of the structure of the electrode, and the gradual passivation of the active material. More directly life threatening to the cell is the formation of separator penetrating dendrites that short the cell, as well as the formation of a mossy variety of zinc that appears to accumulate during cycling.

It is clear that the charging of nickel-zinc cells and batteries has unique requirements if all of these conditions are to be avoided. There are numerous charging schemes directed toward improvement of the zinc cycle life, however no scheme appears to address all of the problems of the zinc electrode. Pulse charging has been claimed to help capacity maintenance in a number of cases. Katz (Journal of Power Sources, 22,77, 1988) determined that 15.7 $mA/cm^2$ at 30 ms on and 90 ms off helped capacity stability over 125 cycles. Binder & Kordesh (Electrochimica Acta 31,255, 1986) claimed the benefits of a complex waveform consisting of charge, discharge and a rest period; however, the charge time was longer than for conventional constant current methods. U.S. Pat. No. 4,503,378 describes a constant current method of charging nickel zinc cells. Termination of charge is triggered by the detection of an inflection point in the voltage time curve.

A number of pulse techniques have been successfully used on less sensitive battery chemistries. U.S. Pat. No. 4,829,225 outlines a pulse method that defines a charge pulse followed immediately by an equal or larger discharge pulse. As the charge nears completion, the level or duration of the charge and discharge may be reduced. Another pulse method taught in U.S. Pat. No. 3,517,293 teaches that the frequency of the discharge pulse increases as the charge progresses. Yet another technique taught in JP 8317574A uses current pulses that are lowered prior to gas generation, together with extended off periods.

A multiple stage charger for nickel-cadmium cells is described in U.S. Pat. No. 4,670,703 in which there is a high charge rate, a lower current rate and a trickle charge for capacity maintenance. A similar 3-stage system is described in U.S. Pat. No. 4,952,861 for a lead system, but the total charge time is 5–8 hours and both voltage and time trip points are used.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
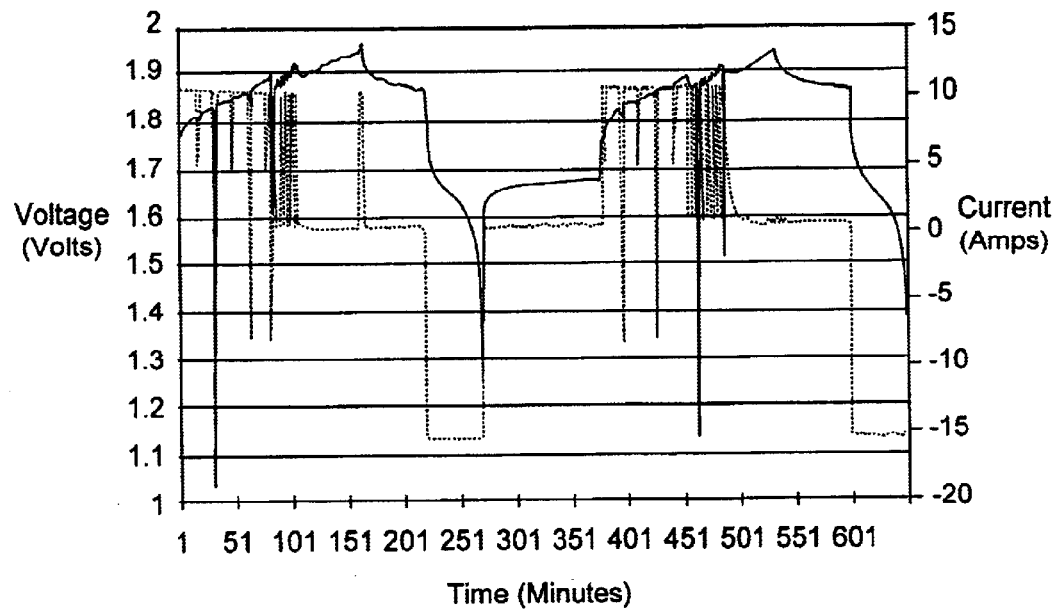
FIG. 1 is a typical charge-discharge profile for a charge cycle in keeping with the present invention.

The novel features which are believed to be characteristic of the present invention, as to its structure, organization, use and method of operation, together with further objectives and advantages thereof, will be better understood from the following discussion.

A charging system is disclosed, that successfully achieves 6 goals. These are outlined as follows:

High battery capacity maintenance without excessive overcharge.

Elimination of moss-like zinc deposits.

Rapid charge under 2 hours.

Maintenance—free operation without high recombination rates.

High cycle life by elimination of shape change, and the inhibition of zinc dendrites, in a zinc electrode which contains no cadmium, mercury or zinc.

Excellent high voltage battery cycling behavior (where many cells are configured in series).

It has been found that the above goals can be achieved by varying the charge method in a specific voltage region (or over a specific state of charge range of the battery) to achieve the specific desired characteristics. A four-stage, pulse-charge regime has been determined to achieve all characteristics. The stages in charging are defined by specific features of the cell chemistry and the manufacturing variances of individual cells. They are defined as the following:

Stage 1: the pre-charge period.

Stage 2: the fast charge period.

Stage 3: the moderate charge period.

Stage 4: the slow charge period.

In some circumstances, as noted hereafter, Stages 3 and 4 may be combined as a single stage; however, close surveillance of the terminal voltage, and changes thereof, is required.

Stage 1 tests the ability of the cell or battery to accept charge. The average applied current is less than C/5, and may be identical to the Stage 3 or Stage 4 waveform. Stage 1 charging takes place in a time less than five minutes. If the average voltage does not achieve an appropriately high voltage (usually greater than 1.76 volts), the charge sequencing is terminated.

Stage 2 is responsible for the rapid recharge of the battery, up to approximately 80% state of charge. The current profile includes a millisecond charge period followed by a shorter discharge period. Charge and discharge currents may be identical to stage 4; however off times are minimized or eliminated, and charge pulses are extended. Typically charge periods between 20–300 ms are used in combination with 1–30 ms discharge currents. The transition to stage 3 occurs between voltages of 1.88–1.92 Volts. The exact trigger point is determined by the operating temperature and the composition of the positive and negative electrodes. Using these parameters for fast charging, dendrite formation has been eliminated, and shape change is minimized.

Stage 3 uses similar values for the charge and discharge pulse currents, but imposes an off period and reduces the duration of the charge pulse. Stage 3 is responsible for the input of between 10–16% of the total battery capacity, measured in amp-hours, when the battery is undergoing charge from zero state of charge. Clearly, when charging a partially charged cell or battery, these percentages could be lower; but the transition points are described here with reference to the charge process of a discharged cell or battery. The combined amp-hour capacity associated with Stage 3 and Stage 4 is 20% of the total battery capacity. The specific portion associated with Stage 3 is governed by the value determined for Stage 4, and the following relationship:

$$S3 = 0.2 \times T - S4$$

where:

S3 is the amp-hour capacity input in Stage 3

T is the total amp-hour capacity of the cell or battery

S4 is the amp-hour capacity input in Stage 4.

The transition between Stage 3 and Stage 4 may be triggered by achieving a voltage per cell between 1.9–1.94 Volt, or by the observation of a time dependent inflection point of the voltage.

Stage 4 completes the charge of the cell or battery. The imposed current waveform is determined by cell characteristics, including the cell to cell variation in capacity, and the minimum recombination rate of oxygen over the life of the cells.

The charge input in Stage 4 during the charging of a discharged battery is 4–10% of the total capacity of the cell or battery and is defined by:

$$S4 > X$$

Where X is the 3 sigma variation in the capacity of unit cells constituting the battery.

The amplitude of the charge pulse should be greater than 2C/3, or 6 mA/cm$^2$, in order to efficiently charge the nickel electrode and evolve minimum oxygen. The discharge amplitude following the charge pulse is greater than 1.5C, or 14 mA/cm$^2$. The charge period is 100 ms or less, with a Q+/Q− greater than 3. These ratios and amplitude values define domains where "mossy zinc" does not form during charge. The minimum off period following the discharge pulse is determined by the following relationship:

$$\text{Off period} = \{(CT \times CI - DT \times DI)/(n \times F \times ORR) - CT - DT\}$$

where

CT is charge time (seconds)

DT is discharge time (seconds)

ORR is the oxygen recombination rate (moles per second)

CI is the charge current (Amperes)

DI is the discharge current (Amperes)

n is the number of electrons in the electrochemical reaction

F is the Faraday constant

Typically, without special construction techniques or the addition of recombination catalysts, the recombination rate is C/20 or lower.

The fourth stage charging is terminated when the average voltage lies at 1.94V or higher at 20° C., or when dV/dt=0. Charging does not resume until the open circuit voltage falls below 1.78V.

A typical current/voltage curve for a charge/discharge cycle is shown in FIG. 1. This curve has been achieved in a nickel-zinc cell containing the electrolyte described in U.S. Pat. No. 5,215,826, and a lead and cadmium free zinc electrode (as taught in several copending applications filed simultaneously herewith).

FIG. 1 teaches a typical charge-discharge profile (as found in Stages 2–4).

Figure 2:
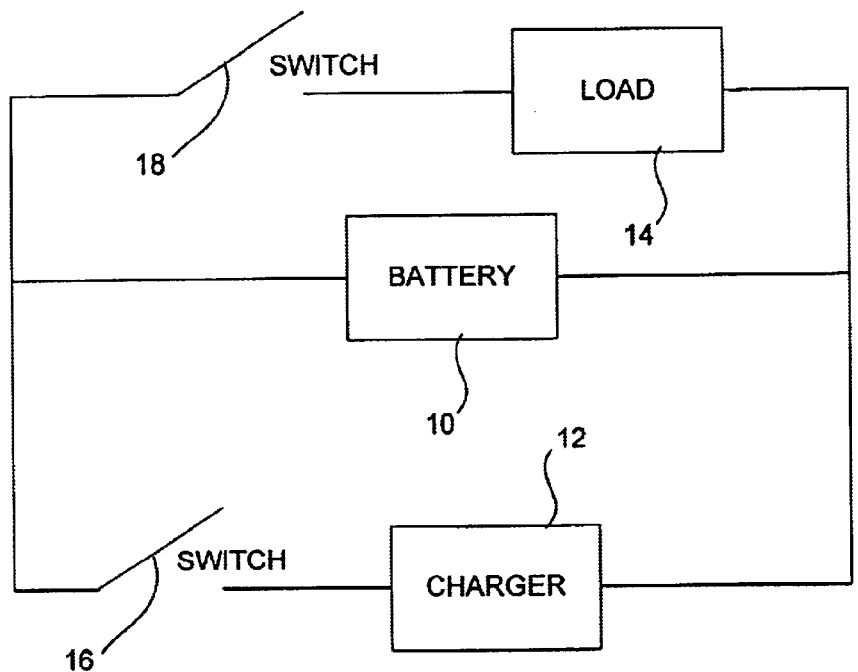
FIG. 2 is a simplified representation of a pulse charging circuit.

A simplified representation of a pulse charging circuit is shown in FIG. 2. Here, the battery 10 is connected so as to be in parallel-that is, to be connected a cross—either a charger 12 or a load 14. Switches 16 and 18 are arranged to work independently one of the other, where switch 16 puts the charger 12 into a circuit with the battery 10, and switch 18 puts the load 14 into a circuit with the battery 10.

The charger 12 is a constant current source charger, which is controlled and thereby capable of interruption of the charging current as a consequence of a microprocessor controlled switch or an FET, shown generally at 16. Likewise, the reverse pulse by which a drain is put on the battery 10, as described above, is effected by operation of the switch 18, also a microprocessor controlled switch or an FET.

In a four stage charger, as described above, Stage 1 may comprise 750 ms cycle, having three components shown in the curve 30 as 31, 32, and 33. 31 represents a charge pulse which is 100 ms long; 32 represents a 10 ms discharge pulse; and 33 designates a 640 ms open or rest period.

Figure 4:
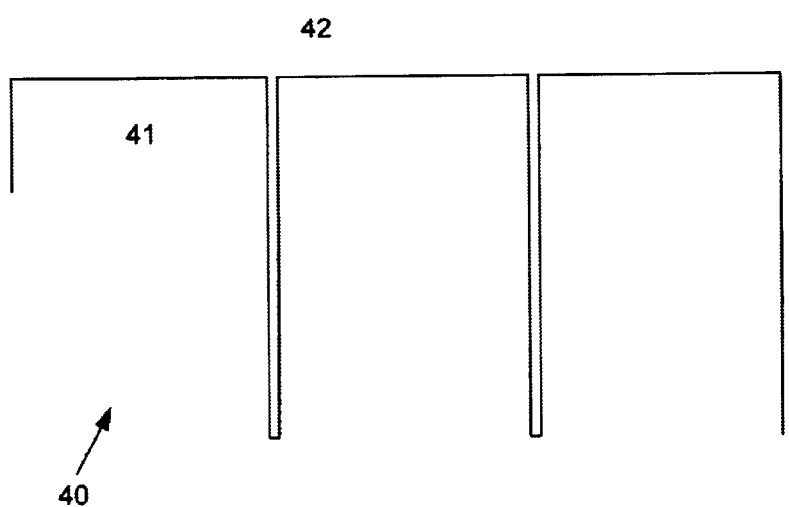
FIG. 4 shows a current profile for the second stage of a four stage charger.

FIG. 4 shows curve 40, showing a 260 ms cycle having a 250 ms charge pulse 41 followed by a 10 ms discharge pulse 42.

Figure 5:
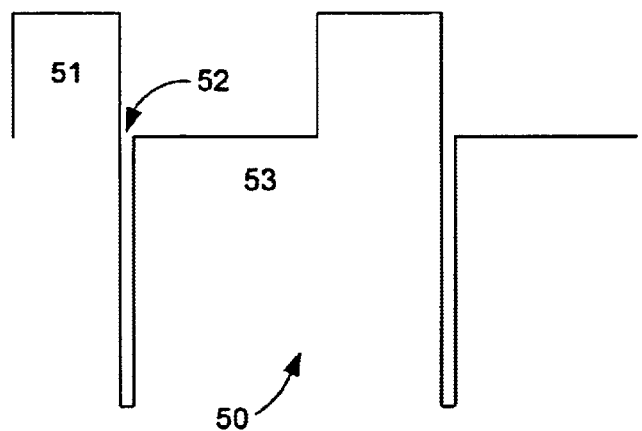
FIG. 5 shows a current profile for the third stage of a four stage charger.

FIG. 5 shows a Stage 3 charging regime, having a current profile 50. Here, a charge pulse 51 lasts for 100 ms, followed by a discharge pulse 52 of 10 ms, and an open or rest period 53 of 270 ms.

Figure 6:
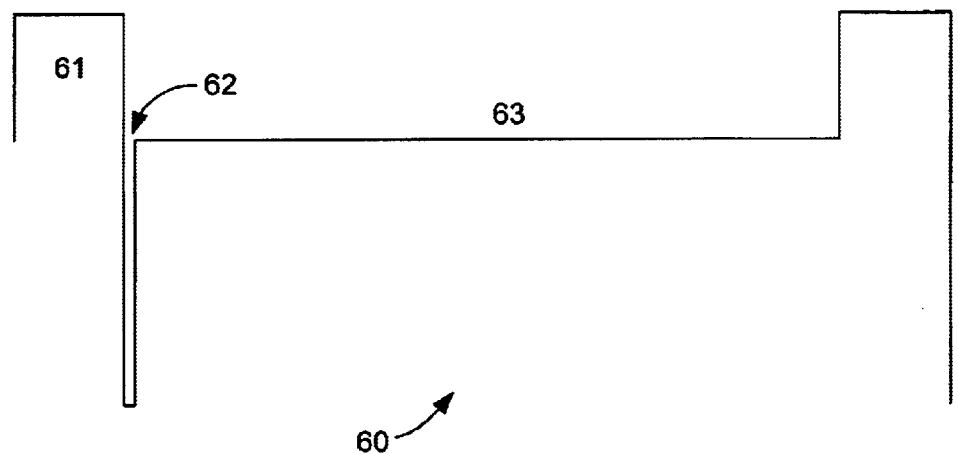
FIG. 6 shows a current profile for the fourth stage of a four stage charger.

FIG. 6 shows a typical current profile for Stage 4. This current profile is shown in curve 60, having a 100 ms charge pulse 61, a 10 ms discharge pulse 62, and an open or rest period 63 which lasts for 640 ms.

Figure 3:
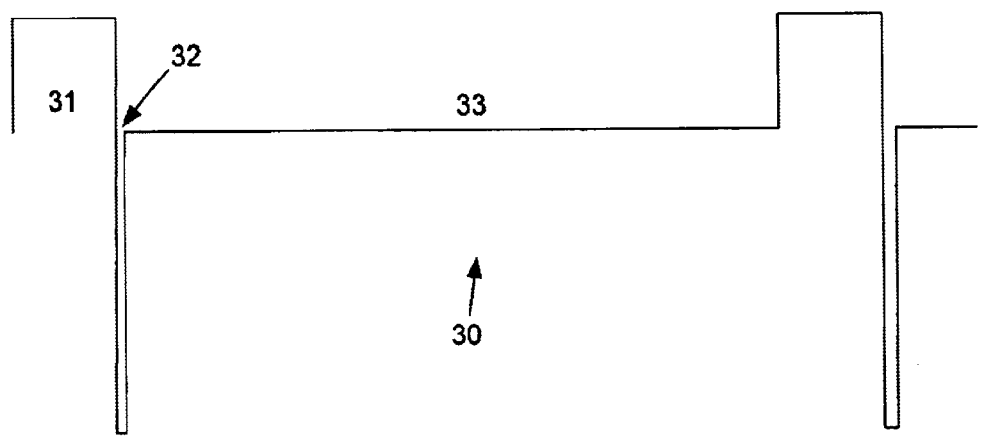
FIG. 3 shows a current profile for the first stage of a four stage charger.

It will be noted from the above that the curves 30 and 60 of FIGS. 3 and 6, respectively, are essentially identical one to another as their charge and discharge pulses and their rest period.

In an alternative embodiment of the 4-stage charge/discharge regime discussed above, a three stage charge/discharge scheme can be employed where Stage 1 and Stage 2 remain as described, but Stage 3 and Stage 4 are merged to create a continuum where the off period is determined by the state of charge of the battery. This may be determined from the voltage response to the discharge pulse, or by the delta V associated with the open circuit and discharge condition, or by an integration of charge technique associated with the charger.

Similarly, Stage 2 and Stage 3 could be merged such that over the course of charging there is a gradual reduction in the charge pulse time, in concert with an extension of the odd-time.

In any charging regime as described above, Stages 2 and 3 may be merged, or Stages 3 and 4 may be merged; and the charge pulse time and the off period between charge pulses may be determined by a state if charge measurement made on the cell or battery being charged.

Other modifications and alternations may be used in the design and manufacture of the apparatus of the present invention without departing from the spirit and scope of the accompanying claims.

What is claimed is:

1. A four-stage charging technique for nickel-zinc cells and batteries, whereby a high cycle life is assured, without dendrite formation or harmful overcharge, with minimal shape change of the zinc electrode, and with minimal oxygen recombination;

wherein, in a first stage, the nickel-zinc cell or battery is provided with an average current less than C/S for a period of less than five minutes, or until the terminal voltage of a cell reaches 1.75 volts to 1.79 volts;

wherein a second stage provides a fast charge until the terminal voltage of a cell reaches between 1.88 volts and 1.92 volts;

wherein a third stage provides a moderate charge until the terminal voltage of a cell reaches 1.90 volts to 1.94 volts; and wherein a fourth stage provides a slow charge period when the terminal voltage is greater than 1.94 volts.

2. The charging technique of claim 1, where the transitions between the stages are according to the following criteria:

the transition from Stage 1 to Stage 2 is by a temperature dependent voltage; the transition from Stage 2 to Stage 3 is by a temperature dependent voltage;

the transition from Stage 3 to Stage 4 is by a time dependent inflection point of the terminal voltage of the cell; and Stage 4 termination is determined when dV/dt=0.

3. A charging technique as claimed in claim 1 or 2, wherein at least 80% of the charge is delivered to the cell or battery prior to the transition to Stage 3.

4. The charging technique of any one of claims 1 and 2, wherein shape change of the zinc electrode, and dendrite formation, are inhibited by providing a charge pulse of 30 ms to 500 ms duration, followed by a discharge pulse of 1 ms to 30 ms duration.

5. The charging technique of any one of claims 1 and 2, wherein the fast charge Stage 2 will inhibit shape change of the zinc electrode and dendrite formation by employing a charge pulse having an amplitude greater than 6 mA/cm$^2$, and a discharge pulse having an amplitude greater than 14 mA/cm$^2$.

6. The charging technique of any of claims 1 and 2, wherein the moderate charge period of Stage 3 will also prevent shape change of the zinc electrode, and dendrite formation, by employing a charge pulse of 10 ms to 100 ms following by a discharge pulse of 1 ms to 30 ms, and a rest period of 20 ms to 300 ms.

7. The charging technique of claim 6, wherein said moderate charge period employs a charge pulse having an amplitude greater than 6 mA/cm$^2$ and a discharge pulse greater than 14 mA/cm$^2$.

8. The charging technique of any of claims 1 and 2, wherein the moderate rate charge Stage 3, or delivery of charge current after termination of Stage 2, provides less than 20% of the total charge input to the cell or battery.

9. The charging technique of any one of claims 1 and 2, wherein the moderate rate charging stage will account for a quantity of charge determined by the relationship $$S3 = 0.2 \times T - S4$$

where:

S3 is the amp-hour capacity input in Stage 3

T is the total amp-hour capacity of the cell or battery

S4 is the amp-hour capacity input in Stage 4.

10. The charging technique of any one of claims 1 and 2, wherein the slow charge stage prevents the formation of mossy zinc, and over charge of the zinc electrode, by employing a charge pulse of 10 ms to 100 ms, followed by a discharge pulse of 1 ms to 30 ms, and a rest period of 100 ms to 1,000 ms.

11. The recharging technique of any one of claims 1 and 2, wherein the charge pulse has an amplitude greater than 6 mA/cm$^2$, and the discharge pulse has an amplitude greater than 14 mA/cm$^2$.

* * * * *